US011879807B2

(12) United States Patent
Akiyama

(10) Patent No.: US 11,879,807 B2
(45) Date of Patent: Jan. 23, 2024

(54) SYSTEM IDENTIFICATION METHOD, SYSTEM IDENTIFICATION DEVICE, AND PROGRAM

(71) Applicant: MEIDENSHA CORPORATION, Tokyo (JP)

(72) Inventor: Takao Akiyama, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/621,128

(22) PCT Filed: Mar. 18, 2020

(86) PCT No.: PCT/JP2020/011937
§ 371 (c)(1),
(2) Date: Dec. 20, 2021

(87) PCT Pub. No.: WO2020/255504
PCT Pub. Date: Dec. 24, 2020

(65) Prior Publication Data
US 2022/0349779 A1   Nov. 3, 2022

(30) Foreign Application Priority Data

Jun. 18, 2019   (JP) .................................. 2019-112564

(51) Int. Cl.
*G01M 15/02* (2006.01)
*G05B 17/02* (2006.01)

(52) U.S. Cl.
CPC ............. *G01M 15/02* (2013.01); *G05B 17/02* (2013.01)

(58) Field of Classification Search
CPC .... G01M 15/02; G01M 17/007; G05B 17/02; G05B 13/042; G05B 2219/25298
See application file for complete search history.

(56) References Cited

U.S. PATENT DOCUMENTS

2012/0116545 A1   5/2012   Yasui

FOREIGN PATENT DOCUMENTS

| JP | 2008-203051 A | 9/2008 |
|---|---|---|
| JP | 4788627 B2 | 10/2011 |

(Continued)

*Primary Examiner* — Bijan Mapar
(74) *Attorney, Agent, or Firm* — Muncy, Geissler, Olds & Lowe, P.C.

(57) ABSTRACT

This system identification method includes: a step (S1) for measuring frequency responses $(\omega, H_{R1}), (\omega, H_{R2}) \ldots$, and $(\omega, H_{Rn})$ in a real system under n sets of disturbances of different magnitudes; a step (S3) for calculating frequency responses $(\omega, H_{M1}), (\omega, H_{M2}) \ldots, (\omega, H_{Mn})$ from input to output in n sets of mechanical models M1 to Mn including i sets (i is an integer of 1 or greater) of common parameters that do not change due to disturbance and j sets of disturbance variable parameters that do change due to disturbance; a step (S4) for calculating the values of a total of n sets of evaluation functions F $(H_{Rk}, H_{Mk})$ and the sum σF thereof, and steps (S3 to S6) for searching for the values of i sets of common parameters and j×n sets of disturbance variable parameters for which the sum σF would meet convergence conditions.

7 Claims, 13 Drawing Sheets

(56) References Cited

FOREIGN PATENT DOCUMENTS

| | | |
|---|---|---|
| JP | 2012-098989 A | 5/2012 |
| JP | 2013-142687 A | 7/2013 |

FIG. 6

|  | LOAD:SMALL | LOAD:MEDIUM | LOAD:LARGE |
|---|---|---|---|
| J1 | 7.68 | 8.38 | 8.36 |
| J2 | 7.04 | 6.72 | 5.79 |
| J3 | 7.72 | 6.89 | 6.26 |
| J1+J2+J3 | 22.44 | 21.99 | 20.41 |
| K1 | $476 \times 10^3$ | $753 \times 10^3$ | $1020 \times 10^3$ |
| K2 | $148 \times 10^3$ | $140 \times 10^4$ | $132 \times 10^4$ |
| Ck1 | 243 | 178 | 113 |
| Ck2 | 81 | 135 | 159 |

FIG. 8

|  | LOAD:SMALL | LOAD:MEDIUM | LOAD:LARGE |
|---|---|---|---|
| J1 | 8.05 | | |
| J2 | 6.52 | | |
| J3 | 7.05 | | |
| J1+J2+J3 | 21.62 | | |
| K1 | $473 \times 10^3$ | $733 \times 10^3$ | $1081 \times 10^3$ |
| K2 | $138 \times 10^4$ | | |
| Ck1 | 251 | 180 | 125 |
| Ck2 | 107 | | |

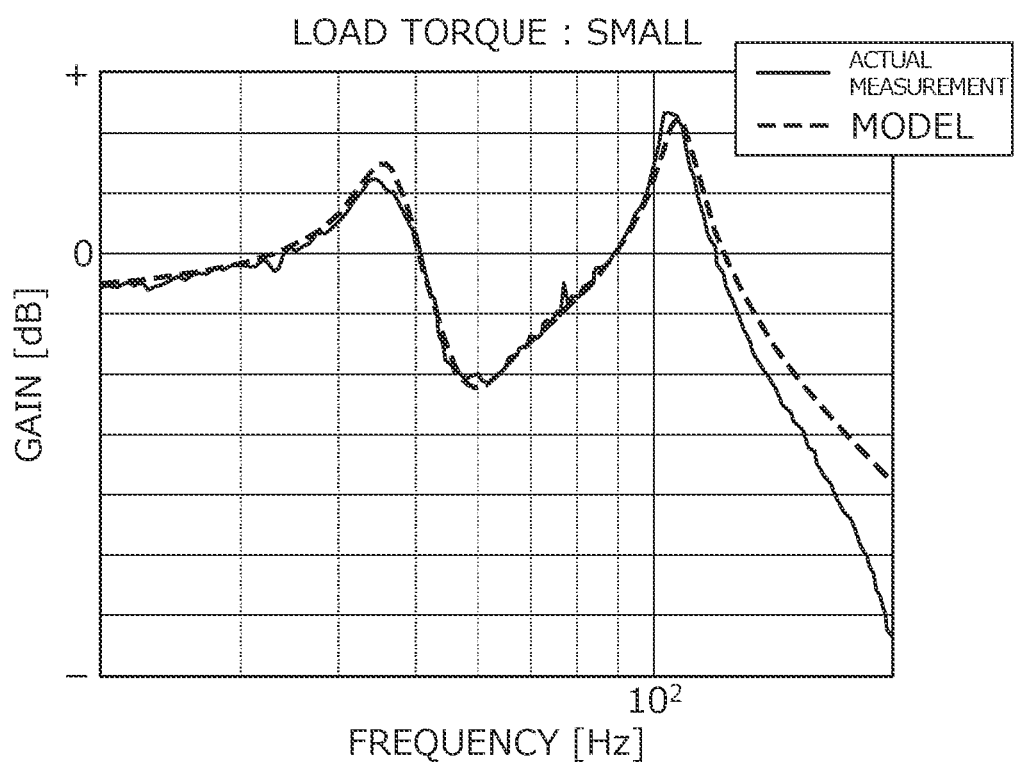

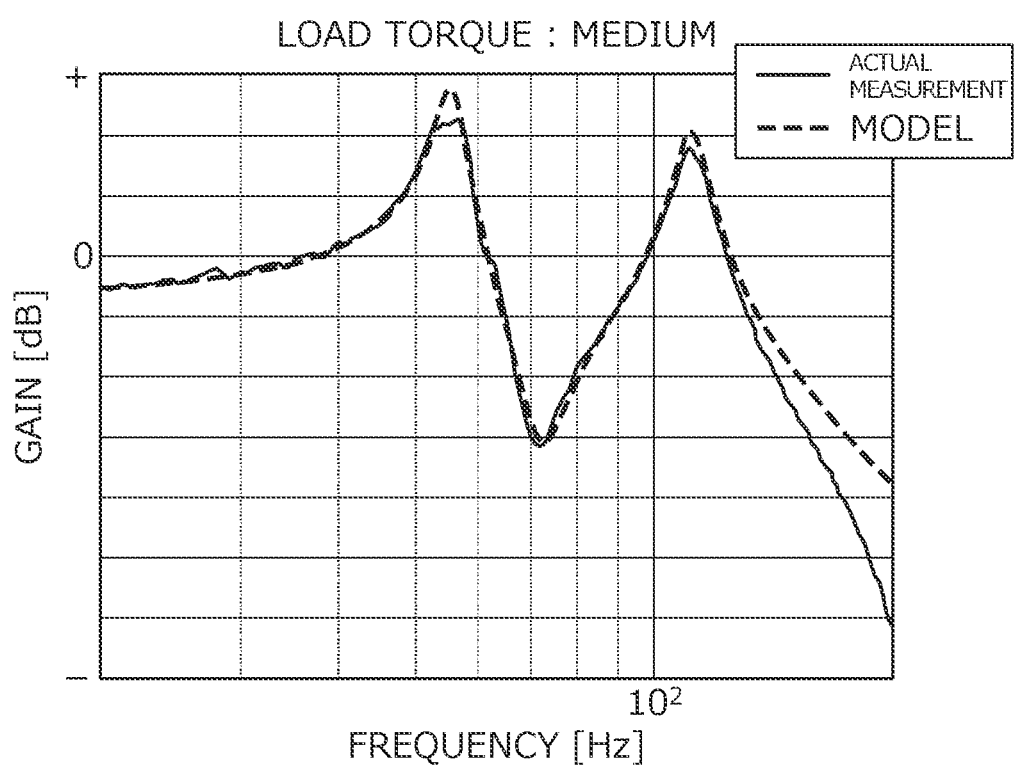

SYSTEM IDENTIFICATION METHOD, SYSTEM IDENTIFICATION DEVICE, AND PROGRAM

TECHNICAL FIELD

The present disclosure relates to a system identification method, a system identification device, and a program. More specifically, the present disclosure relates to a system identification method and the like for identifying values of a plurality of model parameters included in a model for reproducing input/output characteristics of an actual system.

BACKGROUND ART

The controller design method called μ design defines a feedback control system in which a perturbation term which gives variation to model parameters included in a nominal plant, which is a model simulating input/output characteristics of an actual system, imposes a design condition in relation to robust stability for this feedback control system, and designs a controller by a computer so as to satisfy this design condition. Therefore, when designing the controller by the μ design, for example, it is necessary to know in advance the value of the model parameters included in the nominal plant with a certain degree of accuracy by utilizing a parameter estimation method, as shown in Patent Document 1.

In the parameter estimation method shown in Patent Document 1, the value of a plurality of model parameters included in the model is estimated by fitting a Bode diagram provided by actual measurement using the actual system and a Bode diagram provided by the calculation using the model based on the nonlinear programming.

Incidentally, some of the multiple model parameters included in the nominal plant will not change by way of disturbance or will vary greatly by way of disturbance. Therefore, when designing a controller controlling a system as its target for an actual system having such nonlinearity based on the μ design, in order to obtain a highly responsive controller, it is preferable to treat a model parameter that varies with disturbance as a perturbation having an appropriate magnitude corresponding to the variation range, and to treat a model parameter that does not vary with disturbance as no perturbation or a minute perturbation. Therefore, when identifying the value of the model parameter in advance, it is preferable to accurately estimate the model parameter which does not change by way of disturbance, and to accurately estimate the variation range of the model parameter which changes by way of the disturbance.

Patent Document 1: Japanese Patent No. 4788627

DISCLOSURE OF THE INVENTION

Problems to be Solved by the Invention

However, in the parameter estimation method shown in Patent Document 1, the values of all the model parameters are estimated based on one Bode diagram by actual measurement. Therefore, when the actual system has nonlinearity as described above, it is impossible to estimate the model parameters with high accuracy. That is, the parameter estimation method of Patent Document 1 estimates, based on one Bode diagram by actual measurement performed under a certain disturbance, the model parameter that changes by way of the disturbance and the model parameter that does not change by way of the disturbance without distinguishing them from each other. Therefore, such a parameter estimation method brings a contradictory result in that the estimated value of the model parameter that should originally be constant regardless of the disturbance varies depending on the magnitude of the disturbance.

It is an object of the present disclosure to provide a system identification method for identifying a model parameter that does not vary by way of disturbance from a model parameter that varies by way of disturbance by distinguishing them from each other, a system identification device, and a program.

Means for Solving the Problems (1) A first aspect of the present disclosure is directed to a system identification method that identifies, by a computer (for example, the system identification device 1 to be described later), values of a plurality of model parameters included in a model that reproduces input-output characteristics from input (for example, the dynamo torque T3 to be described later) to output (for example, the shaft torque detection signal Tk2 to be described later) in an actual system (for example, the dynamometer system S to be described later), and the method includes the steps of: measuring a frequency response from input to output (for example, n sets of frequency responses $(\omega, H_{R1})$, $(\omega, H_{R2})$, ... $(\omega, H_{Rn})$) in the actual system under n sets of disturbances of different magnitudes (n is an integer of 2 or more) (for example, Step S1 in FIG. 5 to be described later); calculating a frequency response from input to output (for example, n sets of frequency responses $(\omega, H_{R1})$, $(\omega, H_{R2})$, ... $(\omega, H_{Rn})$) in n sets of models (for example, mechanical models M1 to Mn to be described later) including i sets of common parameters (i is an integer of 1 or more) that do not vary by way of a disturbance (for example, common parameters J1, J2, J3, K2, and Ck2 to be described later) and j sets of disturbance variable parameters (j is an integer of 1 or more) that vary by way of a disturbance (for example, disturbance variable parameters (K1 and Ck1) to be described later) (for example, Step S3 in FIG. 5 to be described later); calculating values of a total of n sets of evaluation functions (the n sets of evaluation functions $F(H_{Rk}, H_{Mk})$ to be described later) and a sum of the n sets of evaluation functions (the sum oF to be described later) based on a frequency response measured under a k-th disturbance (k is an integer between 1 and n) and a frequency response of a k-th model (for example, Step S4 in FIG. 5 to be described later); and searching for values of i sets of common parameters and j×n sets of disturbance variable parameters such that the sum satisfies a predetermined condition (for example, Steps S3 to S6 in FIG. 5 to be described later).

(2) In the first aspect, it is preferable that the searching further includes searching for the values of i sets of common parameters and j×n sets of disturbance variable parameters such that the sum satisfies the predetermined condition based on a nonlinear programming method.

(3) In the first aspect, it is preferable that, in the predetermined condition, an amount of change in the sum for minute changes of the i sets of the common parameters and the j×n sets of the disturbance variable parameters is equal to or less than a predetermined value.

(4) In the first aspect, it is preferable that the actual system is a dynamometer system (for example, a dynamometer system S to be described later) including a test piece (for example, an engine E to be described later) and a dynamometer (for example, a dynamometer 3 to be described later) coupled to the test piece.

(5) In the first aspect, it is preferable that the model is a multiple inertia system mechanical model (for example, a mechanical model M to be described later) including two or more inertial bodies (for example, inertial bodies I1, I2, and I3 to be described later) and one or more shaft bodies (for example, shaft bodies A1, A2 to be described later) coupling each of the inertial bodies, the common parameters include moments of inertia of the inertial bodies (for example, moments of inertia J1, J2, J3 to be described later), and the disturbance variable parameters include at least any of a spring stiffness (for example, a spring stiffness K1 to be described later) of the shaft body and a spring loss (for example, a spring loss Ck1 to be described later) of the shaft body.

(6) In the first aspect, it is preferable that the disturbance is a load torque acting on the test piece.

(7) A second aspect of the present disclosure is directed to a system identification device (for example, a system identification device 1 to be described later) that identifies values of a plurality of model parameters included in a model that reproduces input-output characteristics from input (for example, a dynamo torque T3 to be described later) to output (for example, a shaft torque detection signal Tk2 to be described later) in an actual system (for example, a dynamometer system S to be described later), and the device includes: a real frequency response measurement unit that measures a frequency response from input to output (for example, n sets of frequency responses $(\omega, H_{R1})$, $(\omega, H_{R2})$, ... $(\omega, H_{Rn})$) in the actual system under n sets of disturbances of different magnitudes (n is an integer of 2 or more) (for example, the unit relating to the execution of processing of Step S1 in FIG. 5 to be described later); a model frequency response calculation unit that calculates a frequency response from input to output (for example, n sets of frequency responses $(\omega, H_{R1})$, $(\omega, H_{R2})$, ... $(\omega, H_{Rn})$) in n sets of models (for example, mechanical models M1 to Mn to be described later) including i sets of common parameters (i is an integer of 1 or more) that do not vary by a disturbance (for example, common parameters J1, J2, J3, K2, and Ck2 to be described later) and j sets of disturbance variable parameters (j is an integer of 1 or more) that vary by a disturbance (for example, disturbance variable parameters (K1 and Ck1) to be described later) (for example, the unit relating to the execution of processing of Step S3 in FIG. 5 to be described later); an evaluation function calculation unit that calculates values of a total of n sets of evaluation functions (the n sets of evaluation functions $F(H_{Rk}, H_{Mk})$ to be described later) and a sum of the n sets of evaluation functions (the sum σF to be described later) based on a frequency response measured under a k-th disturbance (k is an integer between 1 and n) and a frequency response of a k-th model (for example, the unit relating to the execution of processing of Step S4 in FIG. 5 to be described later); and a searching unit that searches for values of i sets of common parameters and j×n sets of disturbance variable parameters such that the sum satisfies a predetermined condition (for example, the unit relating to the execution of processing of Steps S3 to S6 in FIG. 5 to be described later).

(8) A third aspect of the present disclosure is directed to a program that causes a computer to execute each step of the system identification method according to any one of (1) to (5) above.

Effects of the Invention (1) The system identification method according to the present disclosure includes the steps of measuring a frequency response from input to output in the actual system under n sets of disturbances of different magnitudes; calculating a frequency response from input to output in n sets of models including i sets of common parameters that do not vary by way of a disturbance and j sets of disturbance variable parameters; calculating values of a total of n sets of evaluation functions and a sum of the n sets of evaluation functions based on a frequency response measured under a k-th disturbance and a frequency response of a k-th model; and further searching for values of i sets of common parameters and j×n sets of disturbance variable parameters such that the sum satisfies a predetermined condition. Therefore, according to the present disclosure, the i sets of the common parameters can be accurately identified as a constant value regardless of the magnitude of the disturbance. Furthermore, according to the present disclosure, it is possible to identify the variation width of the j sets of disturbance variable parameters under the disturbance that varies in n steps.

(2) In the present disclosure, the method further includes searching for the values of i sets of common parameters and j×n sets of disturbance variable parameters such that the sum satisfies the predetermined condition based on a nonlinear programming method. According to the present disclosure, the values of the i sets of the common parameters and the j×n sets of the disturbance variable parameters can be identified with high accuracy.

(3) In the present disclosure, searching is performed for the values of i sets of common parameters and j×n sets of disturbance variable parameters such that an amount of change in the sum for minute changes of the i sets of the common parameters and the j×n sets of the disturbance variable parameters is equal to or less than a predetermined value, whereby the values of the common parameters and the disturbance variable parameters are identified. This makes it possible to identify the values of the i sets of the common parameters and the j×n sets of the disturbance variable parameters such that the frequency response measured under each disturbance and the frequency response of each model match most.

(4) In the present disclosure, the actual system is a dynamometer system including a test piece and a dynamometer coupled to the test piece. With such a configuration, the values of the multiple model parameters included in the mechanical model which reproduces the input-output characteristics of the dynamometer system can be identified with good accuracy.

(5) In the present disclosure, the actual system is a dynamometer system, and the model is a multiple inertia system mechanical model including two or more inertial bodies and one or more shaft bodies coupling each of the inertial bodies. Such a multiple inertia system mechanical model includes moment of inertia of each inertial body and spring stiffness and spring loss of each shaft body as model parameters; however, among these model parameters, moment of inertia does not vary by way of disturbance, but spring stiffness and spring loss vary by way of disturbance. Therefore, in the present disclosure, the common parameter is defined as the moment of inertia, and the disturbance variable parameter is defined as at least one of the spring stiffness and the spring loss of the shaft body. Therefore, according to the present disclosure, the moment of inertia can be accurately identified, and the variation range of the spring stiffness and the spring loss can be accurately identified.

(6) In the present disclosure, the disturbance is defined as a load torque acting on the test piece. With such a configuration, the values of the common parameters can be accurately identified under various load torques, and the variation range of the values of the disturbance variable parameters under varying load torque can be accurately identified.

(7) The system identification device according to the present disclosure includes: a real frequency response measurement unit that measures a frequency response from input to output in the actual system under n sets of disturbances of different magnitudes; a model frequency response calculation unit that calculates a frequency response from input to output in n sets of models including i sets of common parameters that do not vary by way of a disturbance and j sets of disturbance variable parameters that vary by way of a disturbance; an evaluation function calculation unit that calculates values of a total of n sets of evaluation functions and a sum of the n sets of evaluation functions based on a frequency response measured under a k-th disturbance and a frequency response of a k-th model; and a searching unit that searches for values of i sets of common parameters and j×n sets of disturbance variable parameters such that the sum satisfies a predetermined condition. Therefore, according to the present disclosure, the common parameters of the i sets can be accurately identified as a constant value regardless of the magnitude of the disturbance. Furthermore, according to the present disclosure, it is possible to identify the variation width of the j sets of the disturbance variable parameters under the disturbance that varies in n steps.

BRIEF DESCRIPTION OF THE DRAWINGS

FIG. 6 is a table showing identification results when values of seven sets of model parameters are identified under three stages of load torque (small, medium, and large) by a system identification device of a comparative example.

FIG. 8 is a table showing identification results when values of eleven sets of model parameters are identified under three stages of load torque (small, medium, and large) by the system identification device of an exemplary embodiment of the present disclosure.

FIG. 9A is a Bode diagram plotting a frequency response (see solid lines) in the dynamometer system measured under the small load torque and a frequency response (see dashed lines) in a small load mechanical model identified by the system identification device of the exemplary embodiment of the present disclosure.

FIG. 9B is a Bode diagram plotting the frequency response (see solid lines) in the dynamometer system measured under medium load torque and the frequency response (see dashed lines) in a medium load mechanical model identified by the system identification device of the exemplary embodiment of the present disclosure.

PREFERRED MODE FOR CARRYING OUT THE INVENTION

Figure 1:
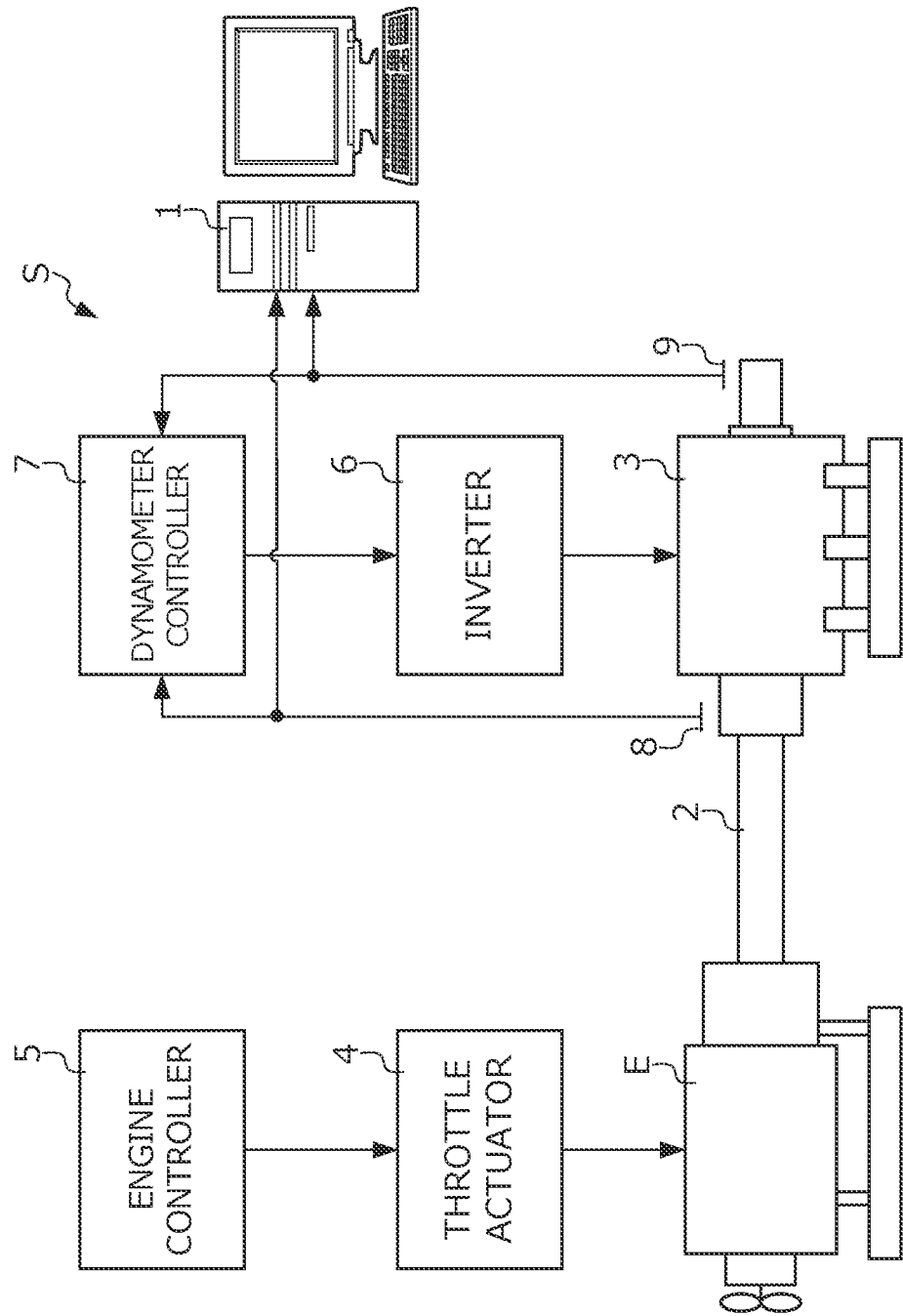
FIG. 1 is a diagram showing the configuration of a system identification device according to an exemplary embodiment of the present disclosure and a dynamometer system modeled by the system identification device.

A detailed description will be given below of exemplary embodiments of the present disclosure with reference to the drawings. FIG. 1 is a diagram showing the configuration of a system identification device 1 according to an exemplary embodiment of the present disclosure, and a dynamometer system S as an actual system to be modeled by the system identification device 1.

In the following, the dynamometer system S will be described as a case of a so-called engine bench system used in evaluating various performances of the engine E for a vehicle. However, the present disclosure is not limited thereto. The dynamometer system S may be a so-called drivetrain bench system used in evaluating various performances of the drivetrain for a vehicle. Here, the drivetrain refers to a generic term of a power transmission device for transmitting the driving power generated by a vehicle power generating source such as an engine or a motor to the drive wheels, and includes an input shaft and an output shaft. In a state in which the drivetrain is mounted in the vehicle, the input shaft is coupled to the power generating source side, and the output shaft is coupled to the drive wheel side.

Figure 5:
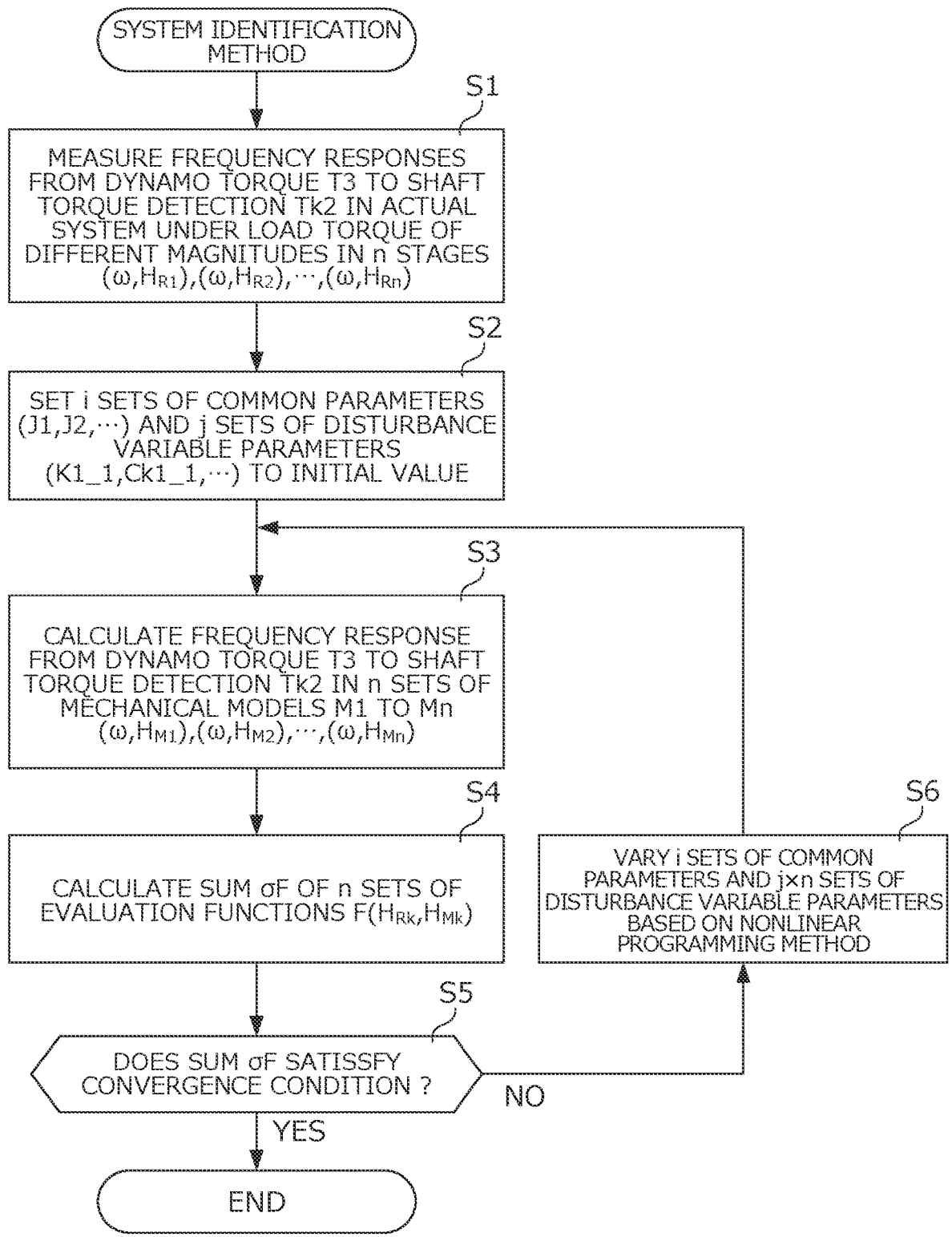
FIG. 5 is a flowchart showing a specific procedure of the system identification method for identifying the values of i sets of common parameters and j×n sets of disturbance variable parameters included in n sets of mechanical models by the system identification device.

The system identification device 1 is a computer on which a program for executing each step of the system identification method described later with reference to FIG. 5 is installed. The system identification device 1 models the input and output characteristics of the dynamometer system S by a model characterized by a plurality of model parameters, and identifies the values of these model parameters.

The dynamometer system S includes an engine E as a test piece, a dynamometer 3 which is coupled via a substantially rod-shaped coupling shaft 2 to the output shaft of the engine E, an engine controller 5 that controls the output of the engine E via a throttle actuator 4, an inverter 6 that supplies power to the dynamometer 3, a dynamometer controller 7 that controls the output of the dynamometer 3 via the inverter 6, a shaft torque sensor 8 that detects the torsional torque generated in the coupling shaft 2 (hereinafter, referred to as "shaft torque"), and a rotational speed sensor 9 that detects the rotational speed of the dynamometer 3 (hereinafter, referred to as "dynamometer rotational speed").

The dynamometer system S controls the shaft torque and the dynamometer rotational speed using the dynamometer controller 7 while controlling the load torque of the engine E using the engine controller 5, whereby testing for evaluating the durability, fuel consumption, and exhaust purification performance of the engine E is performed.

The shaft torque sensor 8 generates a shaft torque detection signal corresponding to the shaft torque in the coupling shaft 2, and transmits the signal to the dynamometer controller 7 and the system identification device 1. The rotational speed sensor 9 is, for example, an encoder, generates a rotational speed detection signal corresponding to the dynamometer rotational speed of the dynamometer 3, and transmits the signal to the dynamometer controller 7 and the system identification device 1.

The engine controller 5 controls the load torque of the engine E via the throttle actuator 2. The dynamometer controller 7 generates a torque current command signal to the dynamometer 3 based on the shaft torque detection signal and the rotational speed detection signal under the control of the load torque of the engine E by the engine controller 5. The inverter 3 supplies power to the dynamometer 3 based on the torque current command signal generated by the dynamometer controller 7.

In the dynamometer system S as described above, the input is constituted by a dynamo torque proportional to the torque current command signal by the dynamometer controller 7, the output is constituted by a shaft torque detection signal by the shaft torque sensor 8, and the disturbance is constituted by the load torque of the engine E controlled by the engine controller 5.

The system identification device 1 models the input and output characteristics from the torque current command signal to the shaft torque detection signal in the dynamometer system S with a mechanical model as described below, and identifies the values of the multiple model parameters included in this mechanical model.

Figure 2:
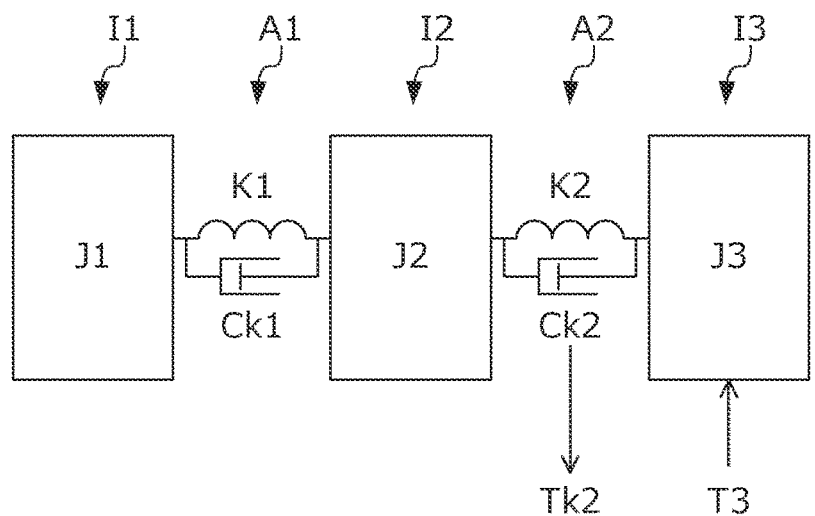
FIG. 2 is a diagram schematically showing a mechanical model for reproducing input-output characteristics from a torque current command signal to a shaft torque detection signal in the dynamometer system.
Figure 3:
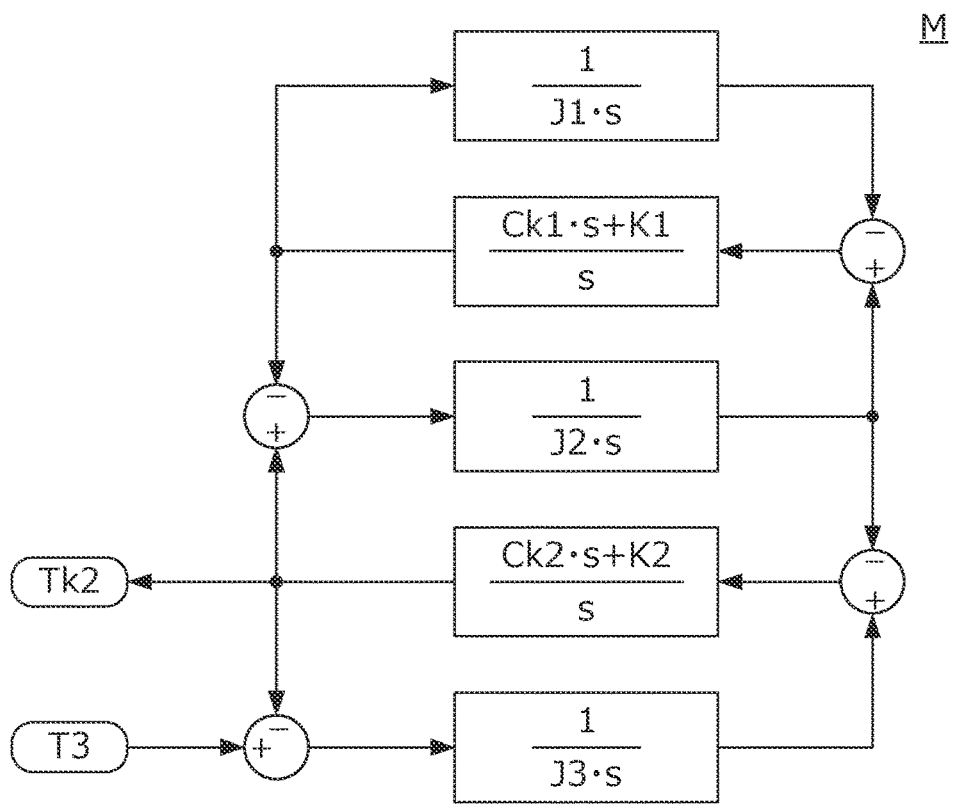
FIG. 3 shows the mechanical model of FIG. 2 expressed by a transfer function.

FIG. 2 is a diagram schematically showing a mechanical model M of the dynamometer system S. Furthermore, FIG. 3 shows the mechanical model M as a transfer function.

In the system identification device 1, the input and output characteristics in the dynamometer system S are modeled by a multiple inertia system mechanical model including two or more inertial bodies and one or more shaft bodies coupling each inertial body. More specifically, in consideration of the fact that the engine as a test-piece body includes a clutch, the system identification device 1 models the input and output characteristics in the dynamometer system S by a three inertia system mechanical model M including three inertial bodies of a first inertial body I1, a second inertial body I2, and a third inertial body I3, and two shaft bodies of a first shaft body A1 and a second shaft body A2 coupling these three inertial bodies I1, I2, and I3 (refer to FIG. 2). In the three inertia system mechanical models M shown in FIGS. 2 and 3, the dynamo torque T3 is inputted to the third inertial body I3, and the shaft torque detection signal Tk2 is outputted from the second shaft body A2.

Hereinafter, the moment of inertia of the first inertial body I1 is set as "J1", the moment of inertia of the second inertial body I2 is set as "J2", and the moment of inertia of the third inertial body I3 is set as "J3". The first inertial body I1 and the second inertial body I2 are coupled by the first shaft body A1, and the second inertial body I2 and the third inertial body I3 are coupled by the second shaft body A2. Hereinafter, the spring stiffness of the first shaft body A1 is set as "K1", the spring loss of the first shaft body A1 is set as "Ck1", the spring stiffness of the second shaft body A2 is set as "K2", and the spring loss of the second shaft body A2 is set as "Ck2".

As described above, in the system identification device 1, the input-output characteristics in the dynamometer system S are modeled by a total of seven model parameters (J1, J2, J3, K1, K2, Ck1, and Ck2). Furthermore, in such a three inertia system mechanical models M, the first shaft body A1 has been introduced in consideration of a clutch included at the engine E. Therefore, the spring stiffness K1 and the spring loss Ck1 of the first shaft body A1 may vary depending on the load torque of the engine E. Therefore, in the system identification device 1, among these seven model parameters, two sets of model parameters of the spring stiffness K1 and spring loss Ck1 are treated as disturbance variable parameters which vary with load torque, and five sets of model parameters of the moment of inertia J1, J2, and J3, the spring stiffness K2, and the spring loss Ck2 are treated as common parameters which do not vary with load torque. It should be noted that, hereinafter, the number of common model parameters is set as i (i is generally an integer of 1 or more, and is 5 in the example of the present exemplary embodiment), and the number of the disturbance variable parameters is set as j (j is generally an integer of 1 or more, and is 2 in the example of the present exemplary embodiment).

Furthermore, in the system identification device 1, the magnitude of the load torque is divided into n stages (n is an integer of 2 or more), and n sets of mechanical models M1 . . . Mn are defined. Hereinafter, a case will be described in which n is defined as 3, and the magnitude of the load torque is divided into the three stages of small, medium, and large.

Figure 4A:
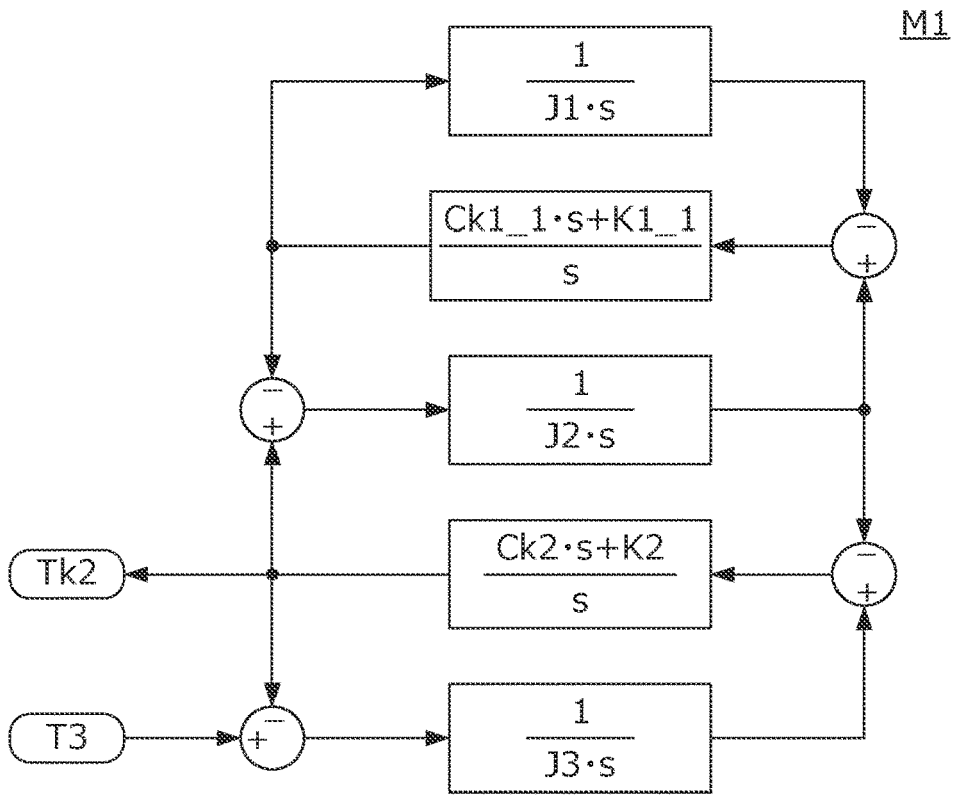
FIG. 4A is a diagram showing a transfer function of a small-load mechanical model when a load torque is small.
Figure 4B:
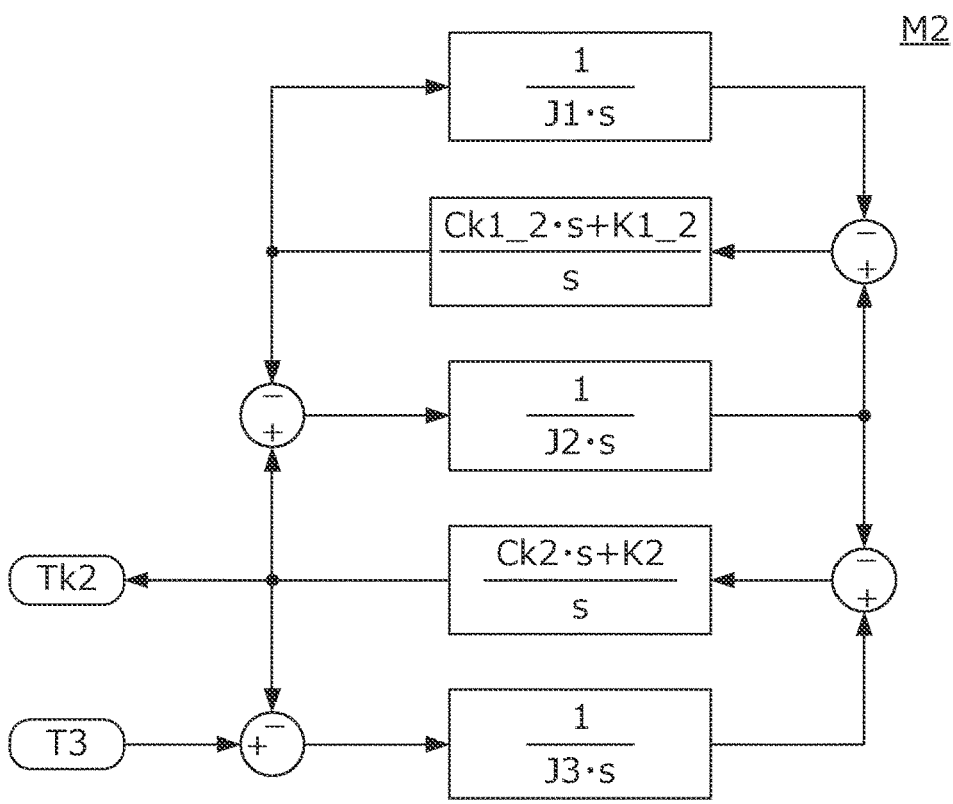
FIG. 4B is a diagram showing the transfer function of a medium-load mechanical model when the load torque is medium.
Figure 4C:
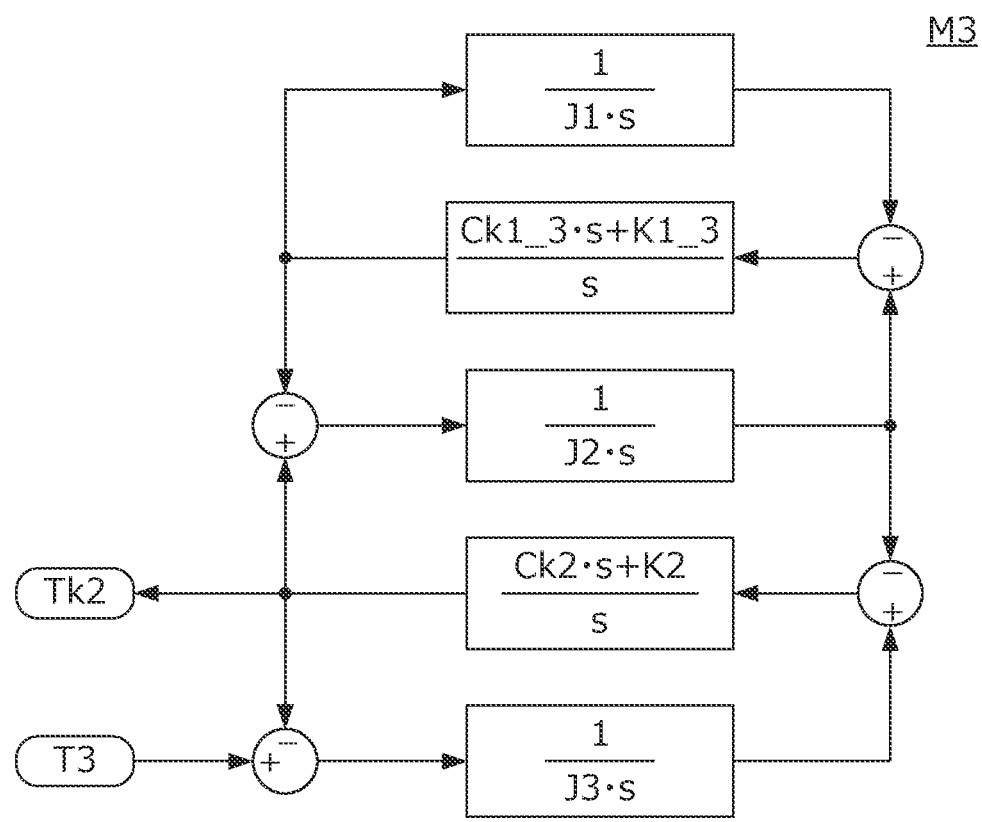
FIG. 4C is a diagram showing the transfer function of a large-load mechanical model when the load torque is large.

FIG. 4A is a diagram showing the transfer function of the small load mechanical model M1 when the load torque is defined as small. FIG. 4B is a diagram showing the transfer function of the medium load mechanical model M2 when the load torque is defined as medium. FIG. 4C is a diagram showing the transfer function of the large load mechanical model M3 when the load torque is defined as large.

As shown in FIGS. 4A to 4C, the structures of the transfer functions of the three sets of mechanical models M1 to M3 are the same. Furthermore, the five sets of common parameters (J1, J2, J3, K2, and Ck2) that do not vary with the load torque are defined as common model parameters in the three mechanical models M1, M2, and M3. Furthermore, the two sets of disturbance variable parameters (K1 and Ck1) that vary with the load torque are defined as independent model parameters (K1_1, Ck1_1, K1_2, Ck1_2, K1_3, and Ck1_3) in the three mechanical models M1, M2, and M3. From the above, in the system identification device 1, the input-output characteristics of the dynamometer system S is modeled by n sets of mechanical models including model parameters of a total of 11 (=i+j×n).

FIG. 5 is a flowchart showing a specific procedure of the system identification method for identifying the values of the i sets of common parameters and the j×n sets of disturbance variable parameters included in the n sets of mechanical models by the system identification device 1.

First, in Step S1, the system identification device 1 measures n sets of frequency responses ($\omega$, $H_{R1}$), ($\omega$, $H_{R2}$), . . . ($\omega$, $H_{Rn}$) from the dynamo torque T3 to the shaft torque detection signal Tk2 in the dynamometer system S, which is an actual system, under a load torque of different magnitudes in n stages, and the processing advances to Step S2. More specifically, the system identification device 1 measures the frequency response from the dynamo torque T3 to the shaft torque detection signal Tk2 by performing vibratory operation for the dynamometer 3 at a predetermined vibration frequency using the dynamometer controller 7 while maintaining the load torque of the engine E at a predetermined magnitude using the engine controller 5. With such a configuration, n sets of frequency responses $(\omega, H_{R1}), (\omega, H_{R2}), \ldots (\omega, H_{Rn})$ are measured under the load torque of different magnitudes in n stages.

Next, in Step S2, the system identification device 1 sets the i sets of the common parameters (J1, J2, . . . ) and j×n sets of the disturbance variable parameters (K1_1, Ck1_1, . . . ) to a predetermined initial value, and the processing advances to Step S3.

In Step S3, the system identification device 1 calculates the frequency response $(\omega, H_{M1}), (\omega, H_{M2}), \ldots (\omega, H_{Mn})$ from the dynamo torque T3 to the shaft torque detection signal Tk2 in the n sets of the mechanical models M1 to Mn, and the processing advances to Step S4.

In Step S4, as shown in the following expression (1-1), the system identification device 1 calculates the values of the total of n sets of evaluation functions $F(H_{Rk}, H_{Mk})$ based on the difference between the frequency response $H_{Rk}$ measured under the k-th (k is an integer between 1 and n) load torque and the frequency response $H_{Mk}$ from the dynamo torque T3 to the shaft torque detecting signal Tk2 in the k-th mechanical model Mk, and further calculates the sum $\sigma_F$ of the n sets of evaluation functions $F(H_{Rk}, H_{Mk})$ as shown in the following expression (1-2). Then, the processing advances to Step S5.

$$F(H_{Rk}, H_{Mk}) = \int_{\omega 0}^{\omega 1} \left| \frac{H_{Mk} - H_{Rk}}{H_{Rk}} \right| d(\log \omega) \quad (1-1)$$

$$\sigma F = \sum_{k=1}^{n} F(H_{Rk}, H_{Mk}) \quad (1-2)$$

In Step S5, the system identification device 1 determines whether or not the sum σF calculated in Step S4 satisfies a predetermined convergence condition. Herein, the convergence condition indicates that the amount of change in the sum σF for minute changes of the i sets of the common parameters and the j×n sets of the disturbance variable parameters is equal to or less than a predetermined value which is set in the vicinity of 0.

When the determination result in Step S5 is NO, the system identification device 1 changes the values of the i sets of the common parameters and the j×n sets of the disturbance variable parameters based on the nonlinear programming method, following which the processing moves back to Step S3 to calculate the frequency responses $(\omega, H_{M1}), (\omega, H_{M2}), \ldots (\omega, H_{Mn})$ in the n sets of the mechanical models M1 to Mn. When the determination result in Step S5 is YES, the system identification device 1 ends the identification of the values of the i sets of the common parameters and the j×n sets of the disturbance variable parameters. As described above, by repeatedly executing the processing of Steps S3 to S6, the system identification device 1 searches for the values of the i sets of the common parameters and the j×n sets of the disturbance variable parameters such that the sum σF satisfies the convergence condition based on the nonlinear programming method.

Next, the identification results of the model parameters included in the three inertia system mechanical models shown in FIGS. 2 and 3 will be compared between the system identification device of the comparative example and the system identification device 1 of the present exemplary embodiment.

Herein, the system identification device of the comparative example refers to the system identification device shown in Japanese Patent No. 4788627 by the Applicant of the present application. That is, the system identification device of the comparative example differs from the system identification device 1 of the present exemplary embodiment in that the model parameters included in the mechanical model are not divided into common parameters that do not vary with the load torque and disturbance variable parameters that vary with the load torque.

Figure 7A:
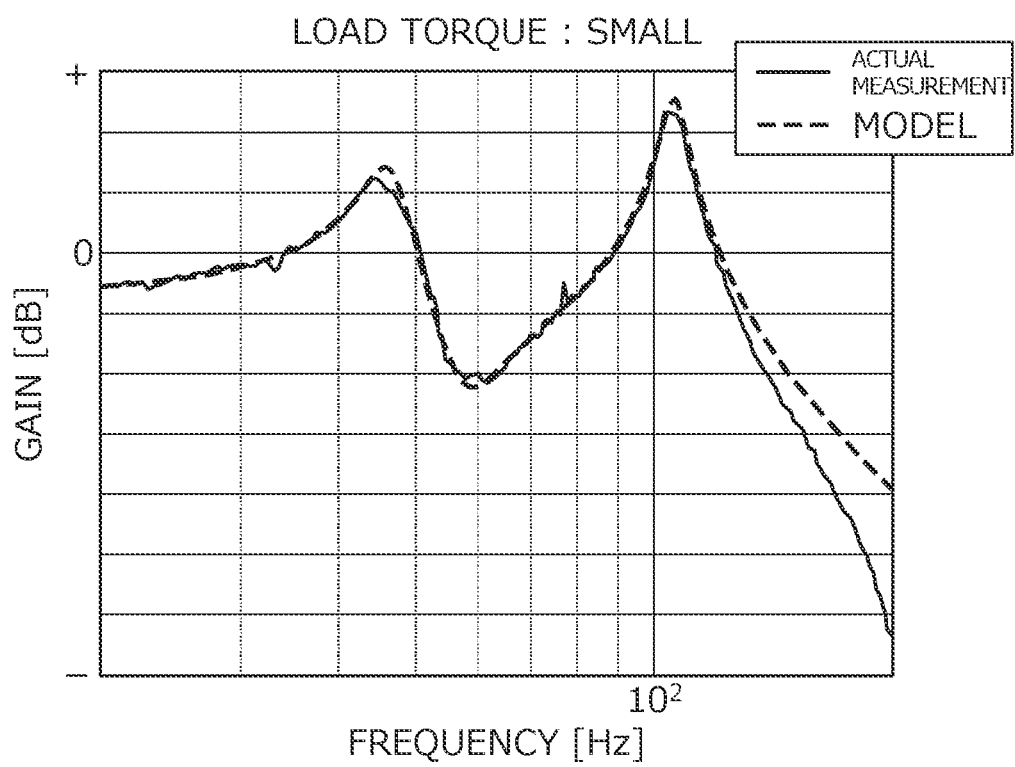
FIG. 7A is a Bode diagram plotting a frequency response (see solid lines) in the dynamometer system measured under the small load torque and a frequency response (see dashed lines) in a mechanical model identified by the system identification device of the comparative example.
Figure 7B:
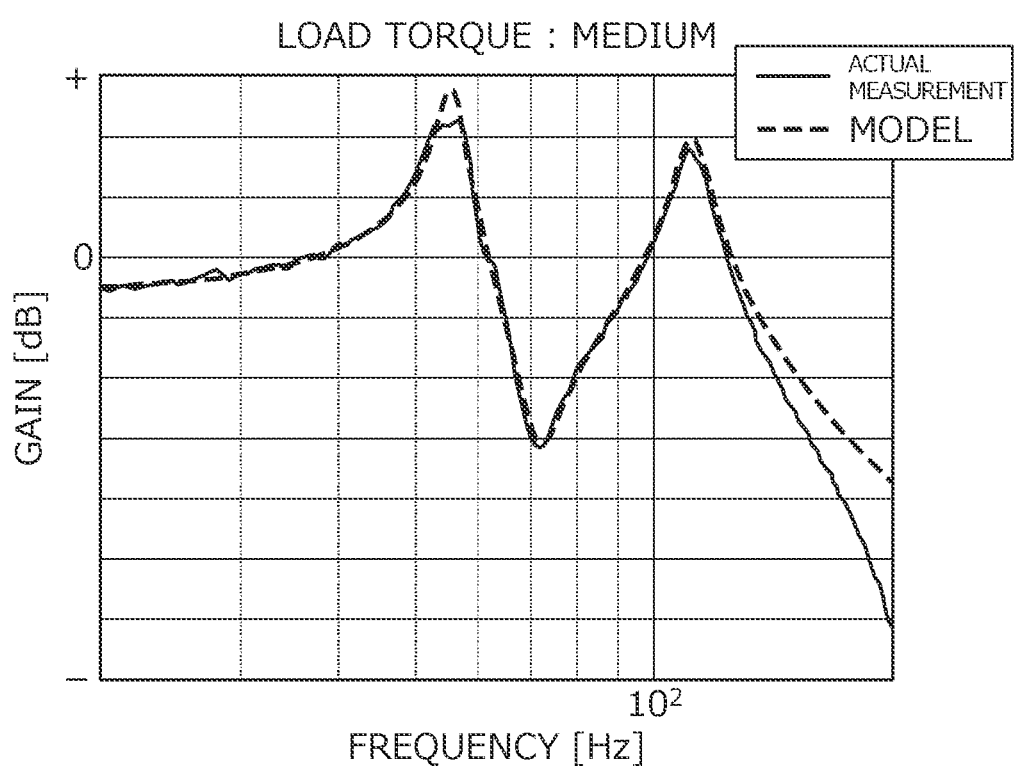
FIG. 7B is a Bode diagram plotting the frequency response (see solid lines) in the dynamometer system measured under medium load torque and the frequency response (see dashed lines) in the mechanical model identified by the system identification device of the comparative example.
Figure 7C:
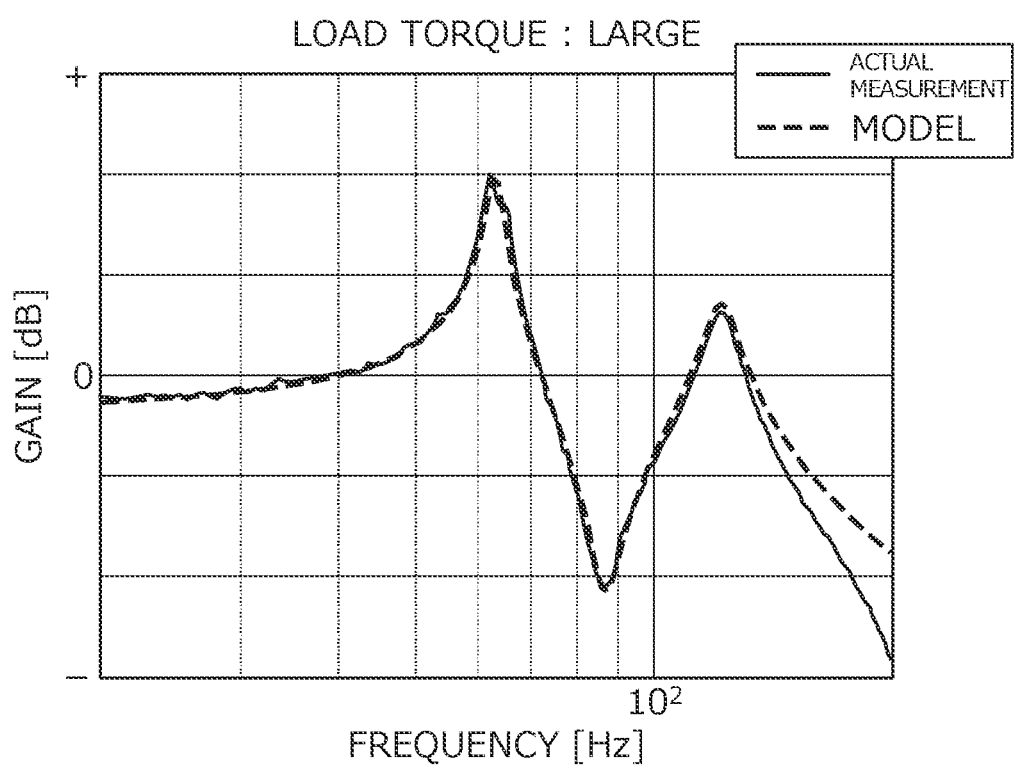
FIG. 7C is a Bode diagram plotting the frequency response (see solid lines) in the dynamometer system measured under high load torque and the frequency response (see dashed lines) in the mechanical model identified by the system identification device of the comparative example.

FIG. 6 is a table showing the identification results when the values of seven sets of model parameters (J1, J2, J3, K1, K2, Ck1, and Ck2) are identified by the system identification device of the comparative example under three stages of the load torque (small, medium, and large). FIGS. 7A to 7C are Bode diagrams, each plotting the frequency response (see the solid lines) in the dynamometer system S measured under three stages of the load torque (small, medium, and large) and the frequency response (see the dashed lines) in the mechanical model identified by the system identification device of the comparative example.

As shown in FIG. 6, in the system identification device of the comparative example, since the values of seven sets of model parameters (J1, J2, J3, K1, K2, Ck1, and Ck2) are identified without distinguishing them between those that vary with the load torque and those that do not vary with the load torque, the moment of inertia J1, J2, and J3, the sum of the moments of inertia (J1+J2+J3), the spring stiffness K2, and the spring loss Ck2 that would otherwise vary with the load torque vary depending on the magnitude of the load torque.

Figure 9C:
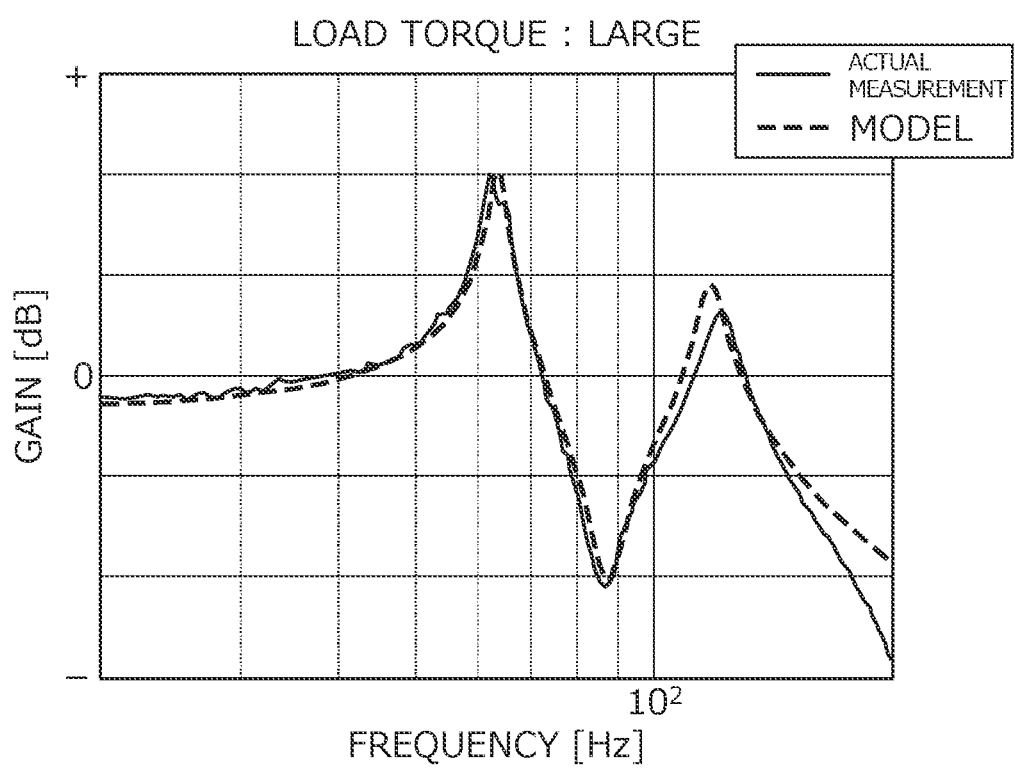
FIG. 9C is a Bode diagram plotting the frequency response (see solid lines) in the dynamometer system measured under high load torque and the frequency response (see dashed lines) in a large-load mechanical model identified by the system identification device of the exemplary embodiment of the present disclosure.

FIG. 8 is a table showing the identification results when the system identification device 1 of the present exemplary embodiment identifies the values of the eleven sets of model parameters (J1, J2, J3, K1_1, K1_2, K1_3, K2, Ck1_1, Ck1_2, Ck1_3, and Ck2) under the three stages of the load torque (small, medium, and large). FIGS. 9A to 9C each show Bode diagrams plotting the frequency response (see the solid lines) in the dynamometer system S measured under three stages of the load torque (small, medium, and large) and the frequency response (see the dashed lines) in the mechanical model M1, M2, and M3 identified by the system identification device 1 of the present exemplary embodiment.

As shown in FIG. 8, in the system identification device 1 of the present exemplary embodiment, seven sets of model parameters (J1, J2, J3, K1, K2, Ck1, and Ck2) are divided into common parameters (J1, J2, J3, K2, and Ck2) that do not vary with load torque, and disturbance variable parameters (K1 and Ck1) that vary with load torque. Therefore, the values of the moments of inertia J1, J2, and J3, the sum of the moments of inertia (J1+J2+J3), the spring stiffness K2, and the spring loss Ck2 are identified at a constant value regardless of the magnitude of the load torque, and the values of the spring stiffness K1 and the spring loss Ck1 caused by the characteristics of the clutch of the engine E are identified so as to vary according to the magnitude of the load torque.

Incidentally, as is apparent by comparing FIGS. 9A to 9C with FIGS. 7A to 7C, the degree of matching of the Bode diagram is higher in the system identification device of the comparative example than the system identification device 1 of the present embodiment. More specifically, for example, as shown in FIG. 9C, according to the system identification device 1 of the present exemplary embodiment, the second resonant point when the load torque set as large is slightly lower than the actual measurement. This is because of the following reasons.

First, in the system identification device of the comparative example, the values of all seven sets of model parameters (J1, J2, J3, K1, K2, Ck1, and Ck2) are independently identified so that the three Bode diagrams at each load torque match. That is, in the system identification device of the comparative example, substantially 21 sets of model parameters are independently adjusted so that the three Bode diagrams match. In contrast, in the system identification device of the present exemplary embodiment, the values of five sets of common parameters (J1, J2, J3, K2, and Ck2) are adjusted in common so that the Bode diagrams match with each load torque, and the values of six sets of disturbance variable parameters (K1_1, K1_2, K1_3, Ck1_1, Ck1_2, and Ck1_3) are adjusted independently. That is, in the system identification device of the present exemplary embodiment, the values of a total of substantially 11 sets of model parameters are adjusted independently so that three Bode diagrams match with each other. As described above, in the system identification device 1 of the present embodiment, the number of model parameters whose values can be adjusted substantially independently is smaller than that of the system identification device of the comparative example. Therefore, it is considered that the degree of matching of the Bode diagrams is lower in the system identification device 1 of the present exemplary embodiment than in the system identification device of the comparative example.

As described above, when only the degree of matching of the Bode diagrams is compared, it can be recognized that the system identification device of the comparative example is higher than the system identification device 1 of the present exemplary embodiment. However, in the system identification device of the comparative example, since the values of the common parameter (J1, J2, J3, K2, and Ck2) that otherwise do not vary with the load torque are adjusted so that the Bode diagrams at each load torque match, the identification accuracy of the value of these common parameter (J1, J2, J3, K2, and Ck2) and the identification accuracy of the variation width with respect to the load torque of the values of the disturbance variable parameters (K1 and Ck1) can be recognized to be higher in the system identification device 1 of the present exemplary embodiment than in the system identification device of the comparative example.

Although exemplary embodiments of the present disclosure have been explained above, the present disclosure is not limited thereto. The configuration of detailed parts thereof may be modified as appropriate within the scope of the gist of the present disclosure.

For example, in the above-described exemplary embodiments, the system identification device 1 has been described for the case in which the dynamometer system S, which is an engine bench system, is modeled by the three inertia system mechanical models including a plurality of model parameters, and the values of these model parameters are identified; however, the present disclosure is not limited thereto. The actual system modeled by the system identification device may be one that can be modeled by a multiple inertia system mechanical model of two or more inertia systems, and may be, for example, a drivetrain system as described above.

EXPLANATION OF REFERENCE NUMERALS

S dynamometer system (actual system)
E engine (test piece)
1 system identification device
2 coupling shaft
3 dynamometer
7 dynamometer controller
8 shaft torque sensor
J1, J2, J3, K2, Ck2 common parameter
K1, Ck1 disturbance variable parameter

The invention claimed is:

1. A system identification method that identifies, by a computer, values of a plurality of model parameters included in a model that reproduces input-output characteristics from input to output in a dynamometer system that includes a test piece and a dynamometer coupled to the test piece, the method comprising the steps of:
measuring a frequency response from input to output in the dynamometer system under n sets of disturbances of different magnitudes (n is an integer of 2 or more);
calculating a frequency response from input to output in n sets of models including i sets of common parameters (i is an integer of 1 or more) that do not vary by way of a disturbance and j sets of disturbance variable parameters (j is an integer of 1 or more) that vary by way of a disturbance;
calculating values of a total of n sets of evaluation functions and a sum of the n sets of evaluation functions based on a frequency response measured under a k-th disturbance (k is an integer between 1 and n) and a frequency response of a k-th model; and
identifying values of i sets of common parameters and j×n sets of disturbance variable parameters such that the sum satisfies a predetermined condition by repeatedly calculating the frequency response and the sum while changing the values of the i sets of common parameters and j×n sets of disturbance variable parameters, wherein
the model is a multiple inertia system mechanical model including two or more inertial bodies and one or more shaft bodies coupling each of the inertial bodies,
the common parameters include moments of inertia of the inertial bodies, and
the disturbance variable parameters include at least any of a spring stiffness of the shaft body and a spring loss of the shaft body.

2. The system identification method according to claim 1, wherein the searching further includes searching for the values of i sets of common parameters and j×n sets of disturbance variable parameters such that the sum satisfies the predetermined condition based on a nonlinear programming method.

3. The system identification method according to claim 1, wherein, in the predetermined condition, an amount of change in the sum for minute changes of the i sets of the common parameters and the j×n sets of the disturbance variable parameters is equal to or less than a predetermined value.

4. The system identification method according to claim 1, wherein the disturbance is a load torque acting on the test piece.

5. The system identification method according to claim 2, wherein, in the predetermined condition, an amount of change in the sum for minute changes of the i sets of the common parameters and the j×n sets of the disturbance variable parameters is equal to or less than a predetermined value.

6. The system identification method according to claim 2, wherein the disturbance is a load torque acting on the test piece.

7. The system identification method according to claim 3, wherein the disturbance is a load torque acting on the test piece.

* * * * *